(12) United States Patent
Boorman

(10) Patent No.: US 6,817,025 B2
(45) Date of Patent: Nov. 9, 2004

(54) NESTING OPTICAL DISC HOLDER

(76) Inventor: Gregg M. Boorman, 9470 Dillou Ct., Durham, CA (US) 95938

( * ) Notice: Subject to any disclaimer, the term of this patent is extended or adjusted under 35 U.S.C. 154(b) by 284 days.

(21) Appl. No.: 10/081,380

(22) Filed: Feb. 21, 2002

(65) Prior Publication Data

US 2002/0114266 A1 Aug. 22, 2002

Related U.S. Application Data

(60) Provisional application No. 60/270,783, filed on Feb. 22, 2001.

(51) Int. Cl.[7] ............................................... G11B 7/24
(52) U.S. Cl. ..................................................... 720/719
(58) Field of Search ...................... 369/289; 206/308.1, 206/309, 310

(56) References Cited

U.S. PATENT DOCUMENTS

| | | | |
|---|---|---|---|
| 1,683,440 A | | 9/1928 | Bodwell et al. ............ 369/291 |
| 2,285,139 A | | 6/1942 | Andres ........................ 274/42 |
| 3,042,413 A | * | 7/1962 | Frink .......................... 369/274 |
| 3,169,682 A | | 2/1965 | Hollingsworth .............. 224/45 |
| 3,259,231 A | | 7/1966 | Romanowski et al. ........ 206/16 |
| 4,148,491 A | | 4/1979 | Stark et al. .................... 274/1 |
| 4,899,330 A | | 2/1990 | Einhaus ....................... 369/289 |
| 4,983,437 A | | 1/1991 | Merrick ....................... 428/41 |
| 5,669,494 A | | 9/1997 | Geffen ..................... 206/308.1 |
| 5,757,765 A | | 5/1998 | Chen .......................... 369/291 |
| 6,112,894 A | | 9/2000 | Kikuchi et al. .......... 206/308.1 |

* cited by examiner

Primary Examiner—David Davis
(74) Attorney, Agent, or Firm—Dean A. Craine

(57) ABSTRACT

An optical disc holder made of molded elastomeric material designed to protect the recorded side of the optical disc and provide a convenient storage method. The holder includes a flat, circular body with a circular, central space formed therein designed to receive the optical disc. Formed on the body is a raised perimeter edge with an undercut ledge formed on its inside surface that engages the perimeter edge of the optical disc when the optical disc is inserted into the central space. The inside surface of the body is concave, thus creating an air space between the recorded surface of the optical disc and the inside surface of the body. Formed on the lower edge of the body is an offset step or beveled edge that creates a circular, downward extending portion on the body that fits snugly into the central opening on a lower disc. The diameter and height of the downward extending portion is sufficient so that adjacent holders may be stacked and locked together. An optional center bore may be formed in the body that enables the holder to be placed on a support base with a vertically aligned spindle.

20 Claims, 6 Drawing Sheets

NESTING OPTICAL DISC HOLDER

This is a utility patent application based on a provisional patent application (Serial No. 60/270,783) filed on Feb. 22, 2001.

BACKGROUND OF THE INVENTION

1. Field of the Invention

This invention relates to holders, covers, jackets, containers, packaging, cases, and the like, meant to protect and hold optical discs. More particularly, it relates to protective holders made of resilient, pliable material that enable multiple optical discs to be vertically stacked and nested together.

2. Description of the Related Art

This invention is a new type of optical disc holder or storage device, which solves the problems associated with the packaging currently available to the public. The current art in packaging of CD's and DVD's can be divided into three basic categories. These categories are, (a) retail acrylic box, (b) retail cardboard or heavy paper, and (c) aftermarket sleeve cases. Retail acrylic cases are typically the original packaging for most audio and information diskettes, whereby the producer can display inlayed paper graphics from within the clear acrylic case. Acrylic cases are well suited for graphic display and product stacking, however, they are brittle and break easily. Retail cardboard or heavy paper packages are actually more durable than the acrylic: however, they do not stack and are prone to tearing, wrinkling, bending, and surface wear. The acrylic and cardboard cases are accepted by the public as disposable. The third category has arisen from a need for durable, space efficient storage, whereby the discs are kept safe, secure, clean, and easily accessible.

Aftermarket sleeve cases are available in a variety of styles and sizes, both with hard shell and soft fabric outer covers. Sleeves for these carrying cases are typically made from RF (radio-frequency) welded thermoplastic fabrics and/or an extruded plastic sheet or film. Aftermarket sleeve cases are currently the most accepted method of storage for most compact discs, especially audio compact discs. There are many different styles of sleeves and cases now on the market. The dilemma is: what to do with a single disc at a work station, in transit, being exchanged, lent to a friend, hand carried, or shipped. Usually, the disc sleeve stays in the case. The CD or DVD disc is therefore transported bare, where it can be exposed to heat, abrasion, or misplaced because of its thin profile and small size.

SUMMARY OF THE INVENTION

It is an object of the present invention to provide an inexpensive, lightweight shipping container that can also be used as a protective holder for an optical disc, such as a CD or DVD.

It is another object of the present invention to provide such a holder that can be easily attached and detached from the disc.

It is another object of the present invention to provide such a holder that can be nested and vertically stacked with a plurality of holders.

S These and other objects are met by the nesting optical disc holder disclosed herein that includes a thin body made of molded, elastomeric material designed to snap-fit around the perimeter edge of an optical recorded disc. The body is a relatively flat circular structure with a circular, recessed central opening formed on one surface and surrounded by a circular, raised perimeter edge. Formed on the inside surface of the raised perimeter edge is a flexible undercut ledge that receives the perimeter edge of the optical disc when the optical disc is placed into the central opening. The central opening is slightly smaller in diameter than the optical disc so that the perimeter edge on the optical disc extends into the undercut ledge when the optical disc is placed inside the central opening.

The inside surface of the body located inside central opening is slightly concaved thereby creating an air gap between the inside surface and the recorded surface on the optical disc. During use, the holder may be held in one hand and the optical disc is aligned and pressed into the central opening. Alternatively, the optical disc may be placed on a flat surface with the central opening aligned over the optical disc. The center portion of the body is then pressed inward thereby creating a suction force inside the body which pulls the disc into the central opening. The optical disc can be easily released from the body by pressing the center portion of the body inward on the side of the body opposite the central opening, which forces the raised perimeter edge of the body outward, thus disengaging the optical disc perimeter edge from the under-cut ledge. Alternatively, the optical disc can be released by simply flexing back the raised perimeter edge of the body to sufficiently distort and disengage the undercut ledge from the perimeter edge of the optical disc.

Formed on the raised perimeter edge of the body is a stepped or beveled edge that forms a circular, downward extending section on the body opposite the central opening. During use, the downward-extending section snap-fits into the central opening on a lower holder. The shape of the beveled edge is sufficient so that the downward extending section fits snuggly into the central opening to temporarily lock the stacked holders together. The length of the downward extending section is also sufficient to terminate above the top surface of an optical disc located inside the central opening on the lower holder.

Formed centrally on the body is an optional center bore which enables a plurality of holders to be aligned and registered over an upward extending spindle attached to an optional support base.

Alternative embodiments of the holder as provided include a printed label attached to the outer surface of the raised perimeter edge. Also, the holder may include four lateral extrusions that enable the holder to be used in a standard disc storage case. The holders can be used individually and may be outfitted with hook and loop attachment methods, double backed adhesive tape, or magnets so they can be attached to most any surface. The holder can be sold as an aftermarket accessory, or purchased with a new disc as the point-of-purchase packaging with or without a shrink-wrap liner.

DESCRIPTION OF THE PREFERRED EMBODIMENT(S)

Figure 1:
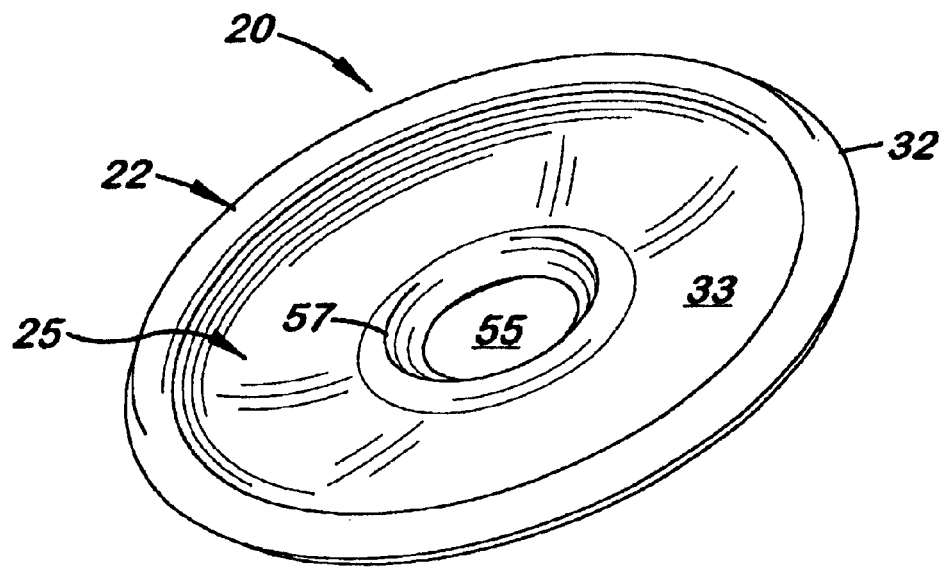
FIG. 1 is a perspective view of the optical disc holder disclosed herein.
Figure 2:
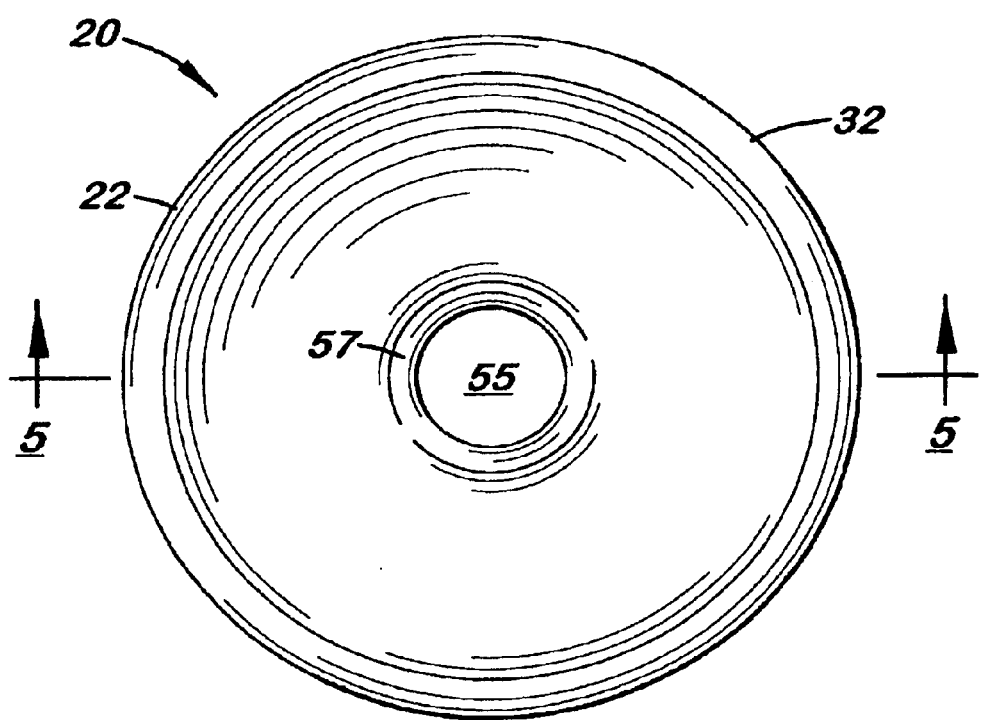
FIG. 2 is a top plan view of the holder.

Shown in the accompanying figures, there is shown a lightweight, inexpensive, optical disc holder, generally referenced as 20, designed to snap-fit around the perimeter edge 32 of an recorded disc 50 to protect the optical disc 50 during storage and transport. The holder 20 is specifically designed to capture the perimeter edge 32 of the optical disc 50 and protect the recorded surface 51 of the optical disc 50 from scratches or impacts. The holder 20 is also designed to be used with other holders 20 that are stacked together with or without an optional support base 60.

The holder 20 includes a thin, flat body 22 with a circular, central opening 25 formed on one surface and surrounded by a circular, raised perimeter edge 32. Formed on the inside surface 33 of the raised perimeter edge 32 is a flexible undercut ledge 34 disposed over a circular slot 36. During use, the perimeter edge of an optical disc 50 is inserted into the circular slot 36 and the undercut ledge 34 snaps over the perimeter edge 53 of the optical disc 50 to hold the optical disc 50 inside the central opening 25. The central opening 25 is slightly smaller in diameter than the optical disc 50 so that the body 22 stretches when the optical disc 50 perimeter edge 53 is inserted into slot 36.

Figure 9:
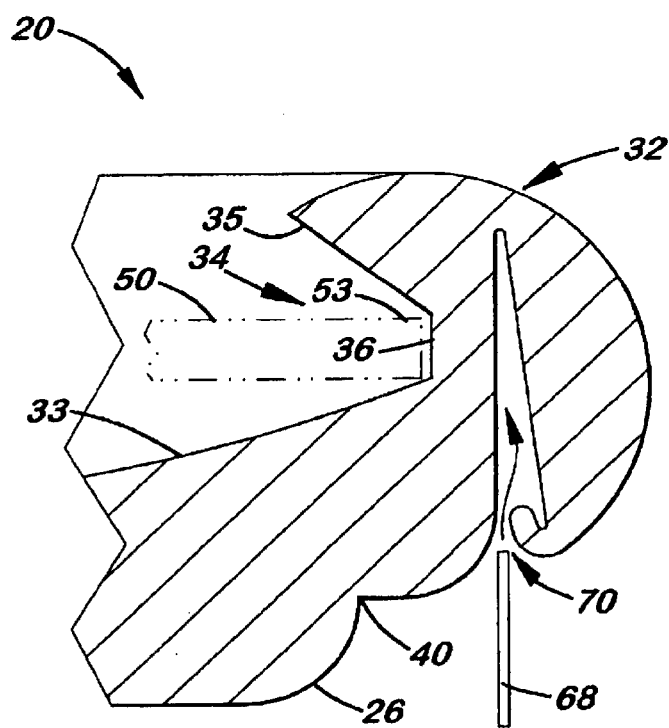
FIG. 9 is an enlarged sectional view of the raised perimeter edge showing the relative location of the optical disc and a slot formed on the raised perimeter edge designed to receive a printed label.

As shown in FIG. 9, the undercut ledge 34 is formed by a continuous diagonally aligned surface 35 formed on the inside surface 33 of the raised perimeter edge 32. The circular slot 36 is formed between the diagonally aligned surface 35 and the inside surface 33.

Figure 3:
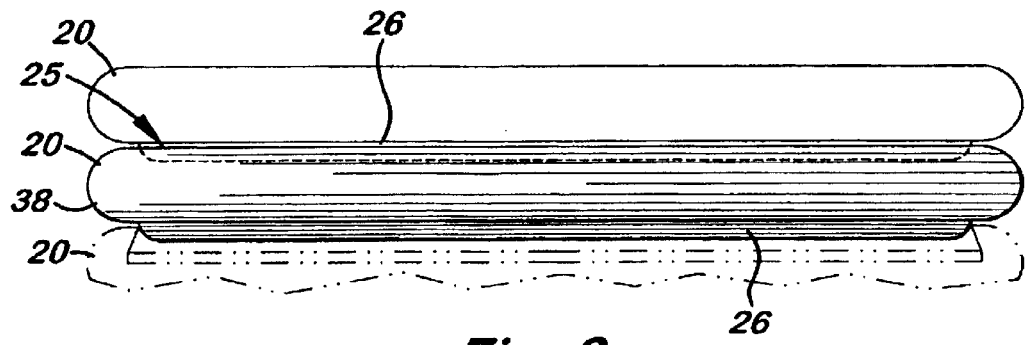
FIG. 3 is a side elevational view of multiple holders stacked together.
Figure 4:
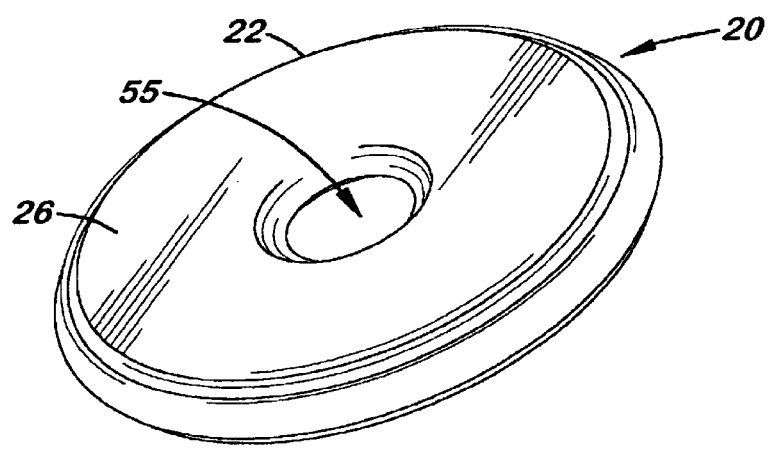
FIG. 4 is a perspective view showing the bottom surface of the downward extending section.
Figure 5:
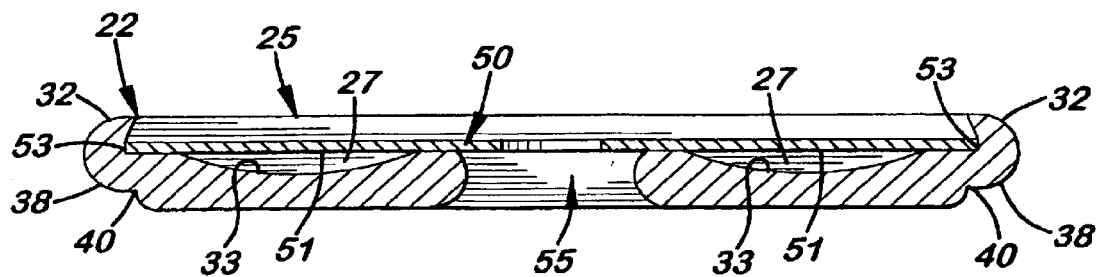
FIG. 5 is a sectional, side elevational view of the holder as seen along line 5—5 in FIG. 2.

As shown in FIGS. 3–5, formed on the bottom surface 38 of the raised perimeter edge 32 of the body 22 is a stepped or beveled circular edge 40 that forms a circular, downward extending section 26 on the body 22 capable of snap-fitting into the central opening 25 on a lower holder 20. The shape and location of the beveled circular edge 40 is sufficient so that the downward extending section 26 fits snuggly into the central opening 25 and presses against or terminates slightly above the top surface 54 of an optical disc 50 that may be located inside the central opening 25 on the lower holder 20.

Figure 6:
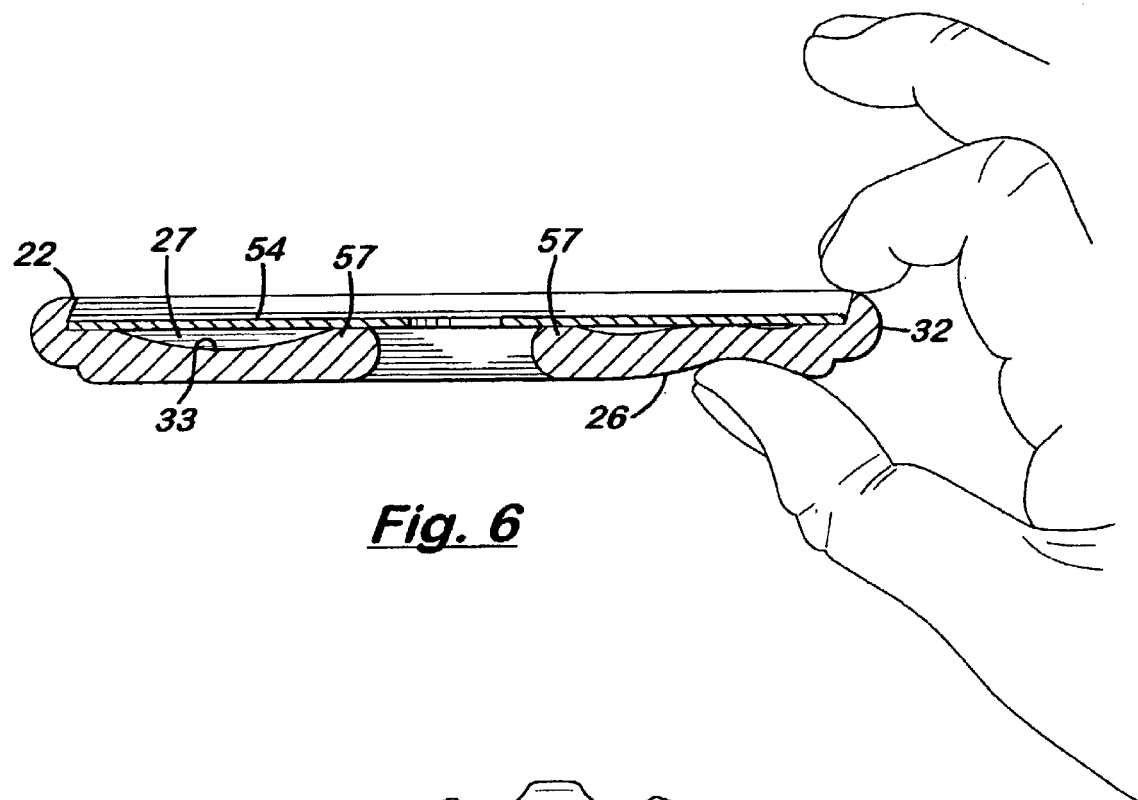
FIG. 6 is a sectional, side elevational view of the holder with an optional disc inserted therein showing a user pressing the downward extending section inward to disengage the perimeter edge of the optical disc from the undercut ledge.

As shown in FIGS. 5 and 6, the inside surface 33 of the body 22 located inside central opening 25 is recessed and slightly concaved thereby creating an air gap 27 between the inside surface 33 and the adjacent recorded surface 51 on the optical disc 50. The air gap 27 prevents the inside surface 33 of the body 20 from contacting and possibly scratching the recorded surface 51.

During use, the holder 20 is held in one hand so that the optical disc 50 may be aligned and pressed into the central opening 25. Alternatively, the optical disc 50 may be placed on a flat surface with the body 22 aligned over the optical disc 50 so that when the downward extending section 26 of the body 22 is pressed inward toward the optical disc 50, a suction force is created inside the body 22 which pulls the optical disc 50 into the central opening 25 of the body 22. As shown in FIG. 6, the optical disc 50 can be easily released from the body 22 by pressing the downward extending section 26 of the body 22 inward on one side of the body 22 opposite the central opening 25, which widens the undercut ledge 34, thus releasing the optical disc 50 from the body 22. Alternatively, the optical disc 50 can be released by simply flexing back the raised perimeter edge 32 of the body 22 to sufficiently distort and disengage the undercut ledge 34 from the perimeter edge 53 of the optical disc 50.

Figure 12:
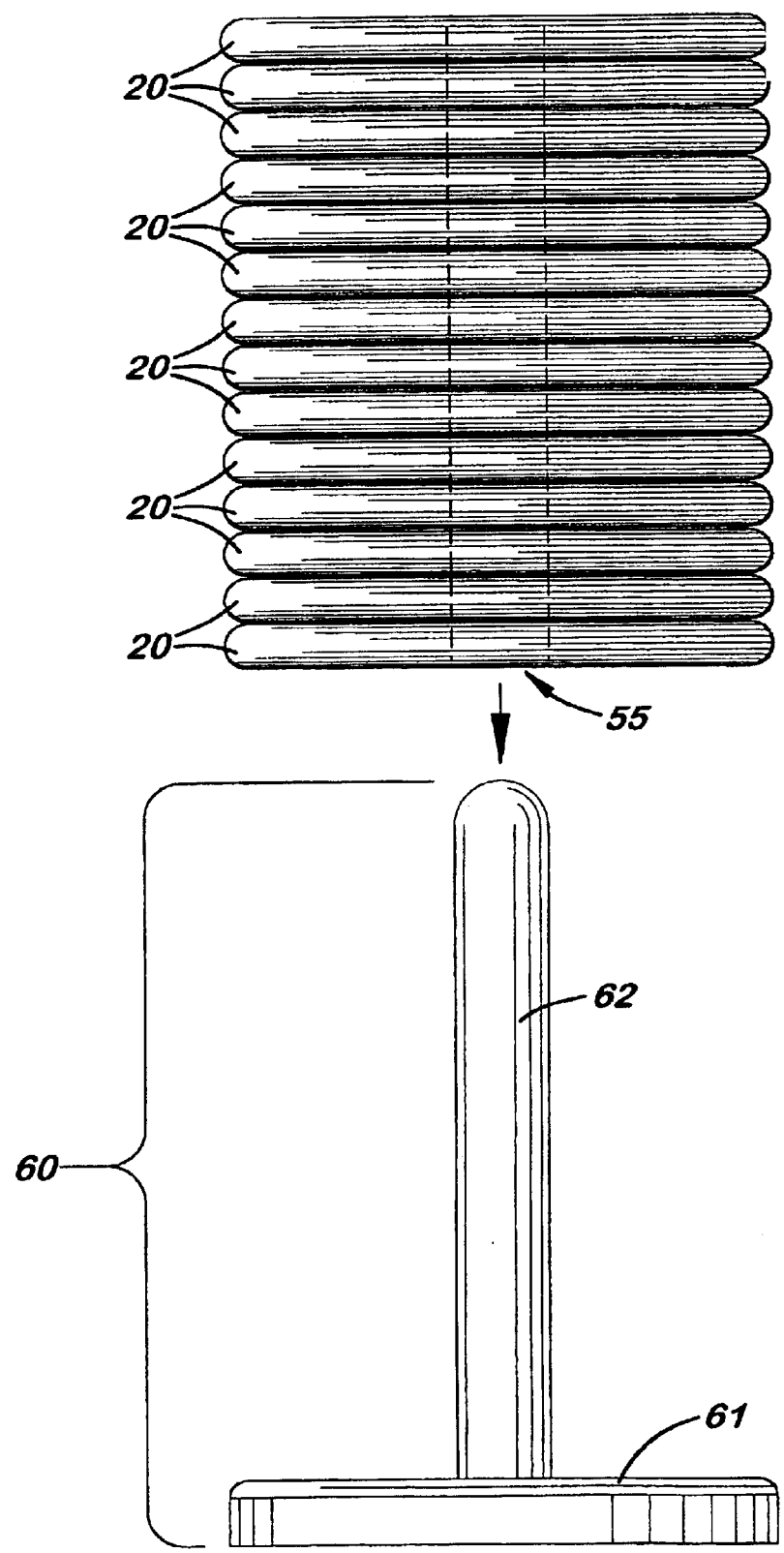
FIG. 12 is a side elevational view of a plurality of stacked holders being vertically aligned on a support base.

Formed centrally on the body 22 is an optional center bore 55 which enables a plurality of holders 20 to be aligned and registered over an upward extending spindle 62 attached to an optional support base 60 shown in FIG. 12. As shown more clearly in FIGS. 5 and 6, the inside surface 33 of the body 22 between the inside wall of the raised perimeter edge 32 and the center bore 55 is concave. A raised outer rim 57 is formed on the inside surface 33 that surrounds the center bore 55 which is used to support the center area on the optical disc 50.

Figure 7:
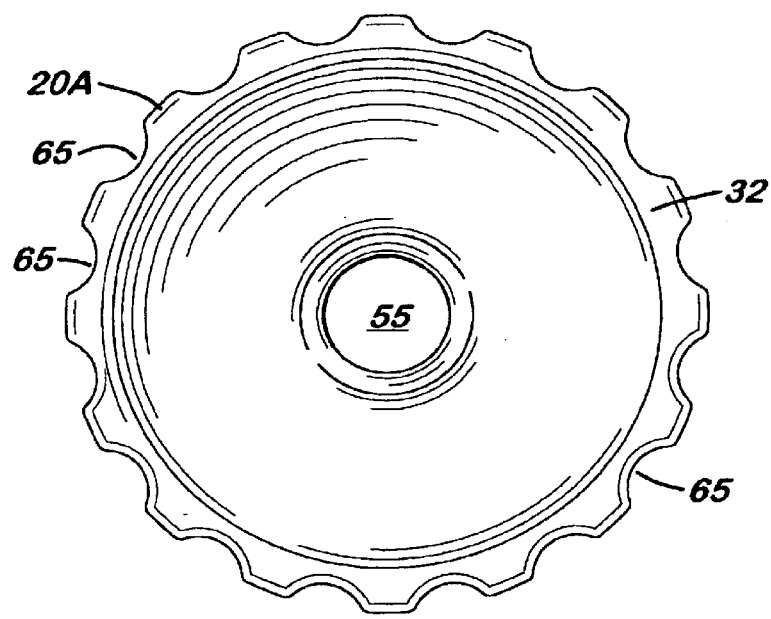
FIG. 7 is a top plan view of a second alternative embodiment of the holder.

In an alternative embodiment of the holder, shown in FIG. 7, referred to as 20A, spaced finger-tip indentations 65 are formed on the outer surface of the body 22 to assist in manipulating the body 22 and help in manual release of an optical disc 50 from the raised peripheral edge 32.

Figure 8:
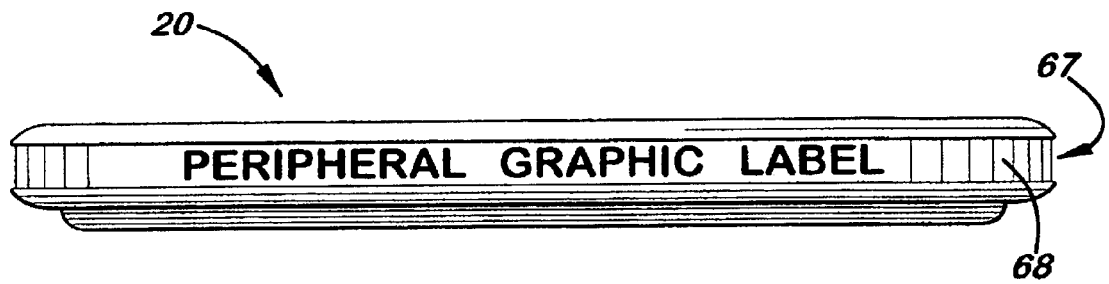
FIG. 8 is a side elevation view of a third embodiment of the holder with a printed label placed inside a recessed band located on the outer surface of the raised perimeter edge.

Also, as shown in FIG. 8, an optional recessed slot 67 may be formed on the outer surface of the perimeter edge 32 designed to hold a graphic label 68. In another embodiment, shown in FIG. 9, the holder 20 may be made of transparent material and a vertical slot 70 may be formed on the raised perimeter edge 32 in which a printed label 68 may be vertically inserted.

As mentioned above, the optional center bore 55 enables a plurality of holders 20 to be aligned and registered over an upward extending spindle 62 attached to an optional support base 60. As shown in FIG. 12, the support base 60 includes a spindle 62 perpendicularly aligned and attached to a lower member 61 which is placed on a flat surface.

Figure 10:
FIG. 10 is a side elevational view of a fourth embodiment of the holder shown in a standard disc storage case.
Figure 11:
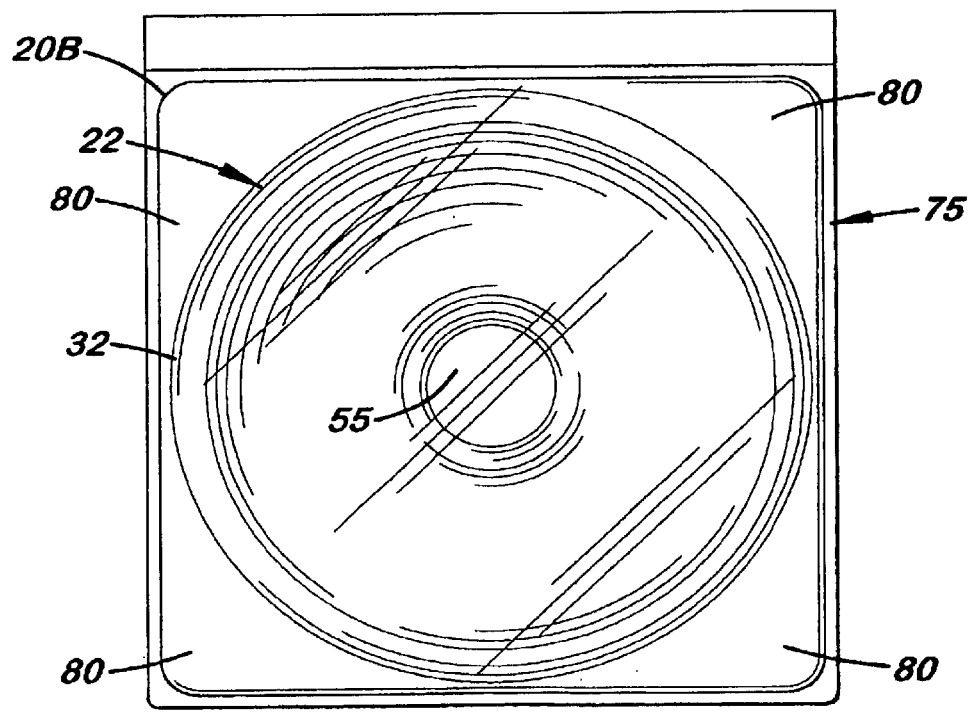
FIG. 11 is a top plan view of the holder shown in FIG. 10.

The holders 20 can be used individually and may be outfitted with hook and loop attachment methods, double backed adhesive tape, or magnets so they can be attached to almost any surface. The holder 20 can be sold as an aftermarket accessory, or purchased with a new disc as the point-of-purchase packaging with or without a shrink-wrap liner. FIGS. 10 and 11 show a third embodiment of the holder, denoted 20B, designed to be used inside a standard storage container 75.

Holder 20B is thinner than holders 20 and 20A and includes four optional lateral surfaces 80 formed on the four opposite corners to form a square-shaped structure. The lateral surfaces 80 are sufficient in size and shape so that the holder 20B fits closely inside a standard optical disc storage container 75. Later, the holder 20B may be removed from the storage container 75 and the lateral surfaces 80 may be cut-away to form a circular holder similar to holders 20 and 20A.

In the preferred embodiment, the body 22 is made of thermoplastic rubbers, such as made of styrene and olefin blocked polymers, or thermo-plastic elastomers, such as ethylene, polypropylene, vinyl, and urethane based polymers. Olefin, ethylene, EVA or PVC foams may be used as well. All of the above materials are injection moldable. In the preferred embodiment, the thermo-plastic material has a durometer of 5 to 100 measured in shore—A scale and a specific gravity between 0.100 and 1.50.

In the preferred embodiment, the body 22 is approximately 0.6 inch thick and approximately 5.5 inches in diameter. The diameter of the central opening 25 is between 4.75 and 5.00 inches in diameter. The central opening 25 is approximately 0.25 inch deep on holders 20 and 20A, and approximately 0.100 inch deep on holder 20B. The perimeter edge 32 of the body 22 is approximately 0.25 to 0.5 inch thick. The side walls of the perimeter edge 32 are between 0.030 and 0.250 inch thick. The downward extending section is between 0.125 and 0.300 inches thick. The center bore 55 is approximately 1 inch in diameter and the rim is approximately 0.125 inch in height. The beveled edge 40 is offset from the outer edge of the body 22 between 0.25 and 0.75 inch.

In some applications it is desirable to both protect the diskette individually but also package it in groups. For this reason, shown in FIG. 10. the invention can be reduced in thickness and in profile to under 0.100 inch. so that such a holder 20 can be inserted into a 22 sleeve case.

In compliance with the statute, the invention described herein has been described in language more or less specific as to structural features. It should be understood, however, that the invention is not limited to the specific features shown, since the means and construction shown, is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. An optical disc holder, comprising:
   a. a flat, circular body made of a flexible material, said body including a circular inside surface;
   b. a raised perimeter edge located on said inside surface thereby forming a recessed central opening capable of receiving an optical disc aligned and registered over said inside surface, said raised perimeter edge having an inside surface;
   c. means to engage the perimeter edge of an optical disc formed on said inside surface of said perimeter edge when an optical disc is disposed inside said central opening and aligned and registered over said inside surface; and,
   d. a downward extending section formed on said body opposite said inside surface, said downward extending section capable of snap fitting into a central opening formed on a lower stacked holder to temporarily lock the stacked holders together.

2. The optical disc holder, as recited in claim 1, wherein said means to engage the perimeter edge of an optical disc is an undercut ledge formed on said inside surface of said raised perimeter edge of said body.

3. The optical disc holder, as recited in claim 1, wherein the inside surface of said body located inside said central opening is concave thereby creating an air gap between said inside surface of said body and an optical disc when aligned and registered inside said body.

4. The optical disc holder, as recited in claim 1, further including a center bore formed in said body.

5. The optical disc holder, as recited in claim 4, further including a raised rim surrounding said center bore.

6. The optical disc holder, as recited in claim 4, further including a support base with a vertically aligned spindle designed to fit inside said center bore.

7. The optical disc holder as recited in claim 1 wherein said body has a durometer of 5 to 100 measured in Shore-A scale.

8. The optical disc holder, as recited claim 1, wherein said body is made of thermo-plastic material with a specific gravity between 0.100 and 1.50.

9. The optical disc holder, as recited in claim 1, further including means to attach a label to said body.

10. The optical disc holder, as recited in claim 9, wherein said means to attach a label is a recessed slot formed on the outside surface of said perimeter edge.

11. The optical disc holder, as recited in claim 1, wherein said body is made of transparent material.

12. The optical disc holder, as recited in claim 1, further including four lateral surfaces formed on said body that enable said body to be fixed inside a flat, square-shaped optical disc storage case.

13. The optical disc holder, as recited in claim 12, further including an optical disc storage case which receives said holder.

14. The optical disc holder, as recited in claim 1, wherein said body is made of thermo-plastic material.

15. The optical disc holder, as recited in claim 14, wherein said body is injection molded.

16. An optical disc holder, comprising:
   a. a body made of a flexible material, said body including a circular inside surface;
   b. a raised perimeter edge located on said inside surface thereby forming a central opening capable of receiving an optical disc aligned and registered over said inside surface;
   c. an undercut ledge formed on said raised perimeter edge used to engage the perimeter edge of optical disc disposed inside said central opening;
   d. a downward extending section formed on said inside surface opposite said central opening, said downward extending section capable of snap-fitting into a central opening formed on a lower stacked holder to temporarily lock stacked holders together; and,
   e. a center bore formed on said inside surface of body.

17. The optical disc holder, as recited in claim 16, wherein said inside surface is concave.

18. The optical disc holder, as recited in claim 17, further including an upward extending rim formed on said inside surface and surrounding said center bore.

19. The optical disc holder, as recited in claim 17, wherein said body is made of thermo-plastic material.

20. The optical disc holder, as recited in claim 16, further including a support base with a vertically aligned spindle designed to fit inside said center bore.

* * * * *